May 3, 1960  J. B. LEWIS, JR  2,935,652
AUTOMATIC PROTECTIVE DEVICE
Filed July 21, 1955

INVENTOR.
JAMES BLAINE LEWIS JR.
BY Louis V. Lucia
ATTORNEY.

United States Patent Office 2,935,652
Patented May 3, 1960

2,935,652

AUTOMATIC PROTECTIVE DEVICE

James Blaine Lewis, Jr., Glastonbury, Conn., assignor to Cardinal Control Company, Incorporated, New Britain, Conn.

Application July 21, 1955, Serial No. 523,593

19 Claims. (Cl. 317—13)

This invention relates to an automatic protective device and more particularly to such a device which is intended for protecting motor driven machines and the like by causing stoppage of said machines upon the occurrence of abnormal conditions during operation thereof.

It is well known that protective devices are available which are intended to electrically measure the mechanical power output from a motor that is used for driving a machine or the like. However, none of these devices are adapted to take into account all of the factors which must be accounted for in order to accurately determine the mechanical power output of the motor. Therefore, such known devices have been found unsatisfactory where control of the motor within close limits is necessary.

The simplest but least accurate of the known devices measures the magnitude of the current input to the motor and operates to de-energize said motor when a preset value of current has been exceeded. If the line voltage is assumed to be exactly constant (an assumption which cannot be safety made in the practical application of such a device), this type of device is workable but it is only capable of very crude operations under conditions of varying line voltage. In any event, such a device is quite unsuitable for single phase induction motors since, even with a constant line voltage, there is little change in the magnitude of a current input due to load changes from zero to maximum for many such motors.

Another well known device measures the magnitude of the current and voltage inputs and operates on the principle that under constant mechanical load conditions the current varies inversely with line voltage along a hyperbolic curve. This is approximately true if the motor is operating at or near full load, but the smaller the load, the less accurate is this assumption and, therefore, at light loads such a device is practically inoperable since an increase in line voltage will result in an increase in current.

There are still other devices which measure current and/or voltage or attempt to measure power, but none of these devices take into account all of the factors necessary to accurately determine the mechanical load from electrical measurements.

My present invention takes into account all of the factors necessary to accurately determine the mechanical load from electrical measurements of the power input and will perform equally well on light or heavy loads. Furthermore, no adjustments, other than presetting the device for the desired tripping load, will be necessary in changing from one load condition to another.

The novel objects and advantages of my invention will be more clearly understood from the following description and from the accompanying drawings in which.

Figure 1:
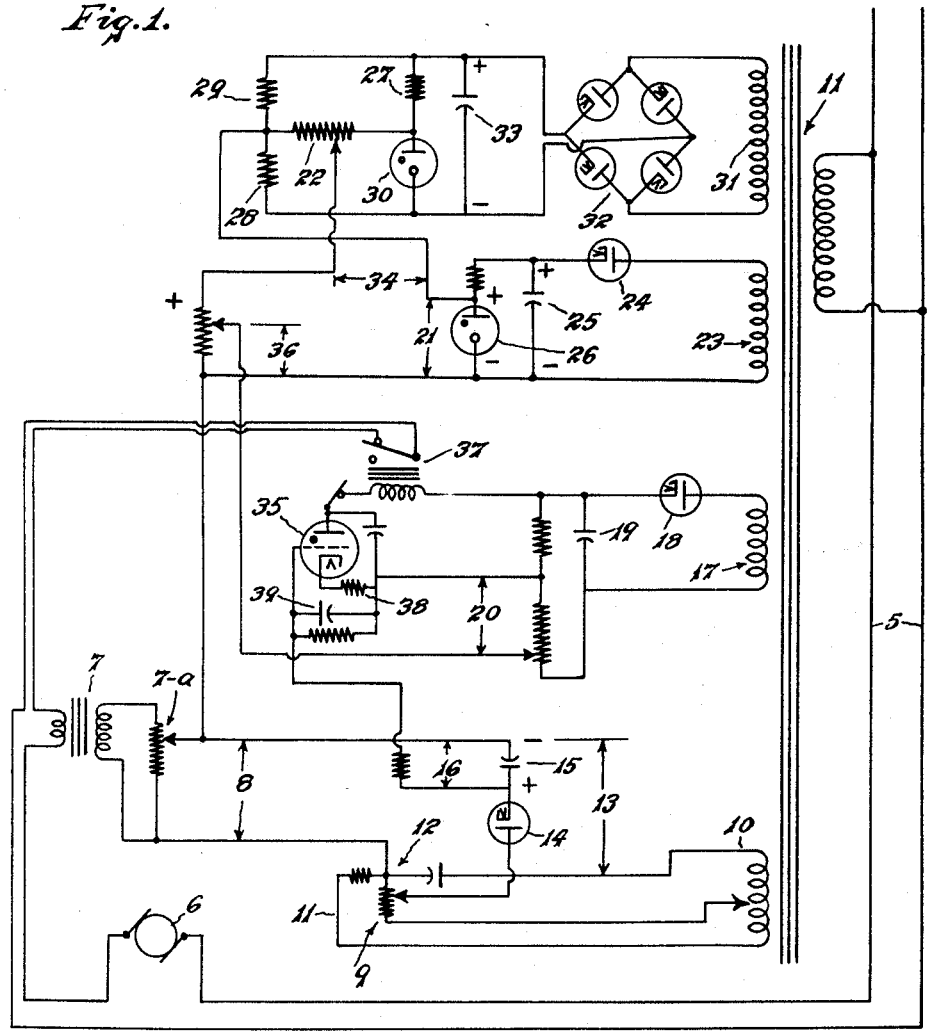
Fig. 1 shows a diagram of an electrical system embodying my present invention.
Figure 2:
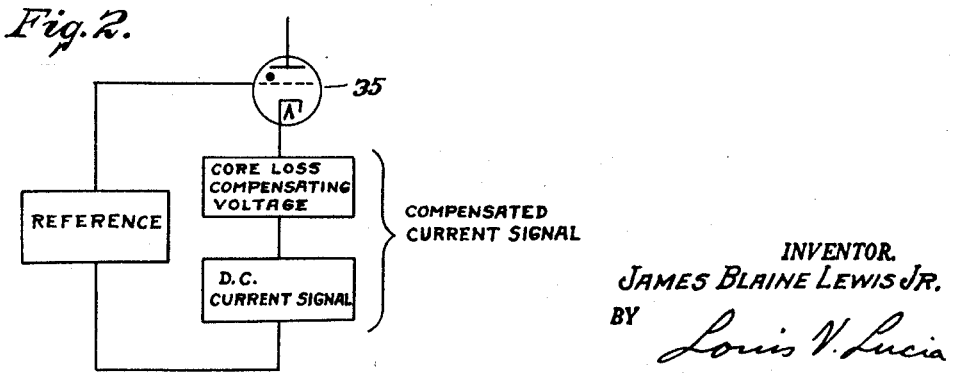
Fig. 2 is a diagrammatic view of the protective circuit showing, generally, the manner in which the compensated D.C. current signal and the reference are connected in series between the grid and cathode of the thyratron.

For convenience, this description and the drawings are applied to a single phase induction motor, but the description will apply equally well to a polyphase motor since the single phase motor can be considered as being one phase of a polyphase motor and therefore comes within the scope of my invention.

As shown in the drawings, the numeral 5 denotes a line for supplying electric current to a motor 6 which is used for driving a machine that is controlled by a device embodying my present invention.

In accordance with this invention, the primary of a current transformer 7 is connected in said line in series with the motor so that the voltage of the secondary of said transformer will be proportional to and in phase with the motor current. A variable resistance is provided at 7-a for adjusting the said transformer to adapt the protective device to motors of different sizes.

The current will always lag the applied voltage and can be considered to have two components, an inphase, or power producing component, and a magnetizing, or exciting component, which lags the applied voltage by 90 electrical degrees. The secondary voltage of the current transformer will therefore also have the same two components and will herein be referred to as the "current signal."

Since the magnetizing component of the current signal is not useful for the purpose of determining mechanical power output, it is desired to cancel out the said magnetizing component from the current signal. This is accomplished, as shown in the drawing, by connecting in series with the current signal a magnetizing component compensating voltage at 9 which is equal in magnitude and 180° out of phase with the magnetizing component. The said magnetizing component compensating voltage is obtained from the line voltage through the secondary 10 of a multiple secondary transformer 11 and a phase shifting network indicated at 12.

The resultant of the current signal voltage and the magnetizing component compensating voltage is a voltage at 13, which is in phase with and proportional to the inphase, or power producing component of the current and is herein referred to as the "compensated current signal."

This means that said magnetizing component compensating voltage will vary directly as the line voltage, but its phase angle will remain constant and this is exactly what is desired since the magnetizing component of the motor current and, therefore, the current signal also vary directly with the line voltage but have constant phase angles.

Therefore, when the magnetizing component of the current signal is cancelled out at one value of line voltage, it will be cancelled out at any value of line voltage and the compensated current signal will be accurate regardless of changes in line voltage conditions.

A further step in my invention is to rectify and filter the compensated current signal, at 14 and 15 respectively, thus giving a D.C. voltage, at 16, that is proportional to the magnitude of the inphase or power producing component of the motor current and which will be herein referred to as the "D.C. current signal." This D.C. current signal is still not sufficiently accurate to be used for indication of mechanical load on the output of the motor because there are power losses therein and the said D.C. current signal must therefore be compensated. The mechanical losses in the motor can be ignored since they can be considered as part of the mechanical power output by merely adjusting the device for setting the desired tripping load at a slightly different value. The power loss to be accounted for here is the core loss (hysteresis and eddy current losses in the iron of the motor). This power loss can be assumed to vary as the square of the line voltage; therefore its current component will vary directly as the line voltage and the portion of the D.C. current signal that represents core loss will also vary directly as the line voltage. The said D.C. current signal can then be compensated for core loss by subtracting therefrom a D.C. voltage that varies directly with line voltage and is equal in magnitude to the portion of the D.C. current signal that represents core loss. This is done by obtaining an A.C. voltage from the line, preferably through a secondary 17 of the transformer 11, rectifying and filtering it, at 18 and 19 respectively, and connecting it in series, polarities opposing, with the D.C. current signal as shown in the drawing. The output from this circuit, which is the difference between the D.C. current signal at 16 and this compensating core loss voltage at 20, is a compensated D.C. current signal which is proportional to that portion of the inphase or power producing component of the motor current that represents actual mechanical power output from the motor.

It is now necessary to treat this compensated D.C. current signal with regard to changes in line voltage. If the motor speed remained constant with changes in line voltage, the mechanical power output would remain constant with such changes. If the other variables, such as motor copper losses, are ignored, then the product of the line voltage and the compensated D.C. current signal will remain constant with varying line voltage and constant mechanical load. This product could then be compared with a fixed reference, but it is not simple to multiply two voltages. However, I have found, in practice, that very accurate operation of a device can be obtained by comparing the compensated D.C. current signal with a compensated D.C. reference voltage (load setting) such that the protective device trips when the compensated D.C. current signal exceeds the said compensated D.C. reference.

The said D.C. compensated reference voltage is made up of two parts, a fixed portion, at 21, and a variable portion, at 22.

The said fixed portion is preferably obtained through a secondary 23 of the transformer 11, rectified at 24, filtered at 25 and regulated at 26. The said variable portion is the output of a D.C. bridge consisting of resistors 27, 28 and 29 and a cold cathode voltage regulator tube 30. D.C. voltage for said bridge is preferably obtained by taking an A.C. voltage from the secondary 31 of the transformer 11 and rectifying and filtering said voltage at 32 and 33, respectively.

The said bridge is balanced at nominal line voltage and its output is zero. When line voltage increases above normal, the output of said bridge is proportional to said increase. When line voltage decreases below normal, the output of said bridge is proportional to said decrease but its polarity is opposite to what it is when line voltage is above normal.

Said fixed and variable portions are connected in series to make up the total reference at 34 and they are connected so that, at line voltages above normal, the variable portion at 22 subtracts from the fixed portion at 21 and, at line voltages below normal, the said variable portion adds to the fixed portion. It will therefore be understood that the total, or compensated, D.C. reference varies inversely with line voltage.

The said compensated D.C. reference voltage is made to vary inversely along a straight line with the line voltage so that it gives a very close approximation to the ideal circuit which would trip whenever the product of the line voltage and the compensated D.C. current signal exceeds a preset value. In other words, this is an approximation of a curve with a straight line but, even though this is an approximation, it is very accurate since the slope of the straight line can be varied by changing the magnitude of the variable portion at 22. Another factor which tends to make this approximation very accurate is that the speed of the motor does not remain exactly constant with changes in line voltage and the output torque does not necessarily remain constant with such changes. Therefore, the previous assumption that the mechanical power output remains constant with changes in line voltage is not completely accurate and, because of these factors, the approximation can, in practice, be more accurate than the supposedly exact method previously discussed.

The comparison of the D.C. current signal with the D.C. reference voltage is accomplished simply by connecting the two in series between the grid and cathode of a thyratron 35 with the polarities opposed and in such a manner that an increase in the signal causes the grid to become more positive (less negative) and an increase in the reference causes the grid to become less positive (more negative). Thus, for a given mechanical load, the reference is adjusted at 36 so that the grid of the thyratron is just barely in the non-conducting region whereby a slight increase in load will cause the compensated D.C. current signal to increase slightly, thus moving the grid of the thyratron into the conducting region and causing the said thyratron to discharge.

My invention, as above described, provides an improved protective device for electric motors which automatically compensates for such factors as magnetizing component, core losses and variations in line voltage conditions to provide a compensated D.C. current signal and then compares said signal with a compensated reference to operate a relay when the said signal exceeds said reference. Therefore, my invention provides a highly efficient and accurate protective device which is responsive only to variations in the power load on the motor.

A suitable relay 37 in the plate circuit of the thyratron operates when the thyratron discharges to initiate (directly or through auxiliary equipment) whatever function is desired as a result of the overload, such as to stop the motor, de-clutch the motor, initiate an alarm, etc.

The device may be made to act as an underload device, rather than an overload device, and to initiate any of the aforementioned functions whenever the mechanical load drops below the preset value, by a simple change of connections between the grid and the cathode so that an increase in signal causes the grid to become less positive (more negative) and an increase in reference will cause the grid to become more positive (less negative). The relay 37 will then trip whenever the compensated D.C. current signal is less than the compensated reference.

If desired, two such thyratron circuits, one connected each way, could be used as a combination overload and underload device.

In order to provide for cathode biasing of the thyratron, for ease of resetting the relay 37, a resistor 38 is inserted so that it is in both the plate to cathode circuit and the grid to cathode circuit. This makes it possible to operate the protective device very near the tripping point and still allow it to be reset easily. When the thyratron fires, the tube current will flow through the resistor 38 and thereby make the cathode end of said resistor positive and the other end negative. This will make the grid more negative than it was when the thyratron fired. When the protective device is reset, the thyratron plate current ceases, as does also the voltage across said resistor 38. However, the condenser 39 and any other condensers in the grid circuit remain charged, for a short time, to this new voltage and thereby render it easier to reset the relay 37.

I claim:

1. A protective device for use with electrically operated means comprising a circuit including a line for supplying electric current to said electrically operated means, means connected in series with said electrically operated means for providing a current signal, means providing a voltage for compensating said current signal for core losses in said electrically operated means, means providing a reference corresponding to a desired load on said electrically operated means, means for comparing the said compensated current signal with the said reference, and means operable upon a variation occurring beyond a predetermined degree between the said compensated current signal and the reference for causing a protective operation of said device.

2. A protective device for use with electrically operated means comprisng a circuit including a line for supplying electric current to said electrically operated means, means connected in series with said electrically operated means for providing a current signal having a power producing component and a magnetizing component, means for compensating the said current signal for the magnetizing component, means converting said compensated current signal to a D.C. current signal, means providing a voltage for compensating said D.C. current signal for core losses in said electrically operated means, means providing a reference corresponding to a desired load on said electrically operated means, means for comparing the compensated D.C. current signal with said reference, and means operable upon the said compensated D.C. current signal varying from the reference beyond a predetermined degree for causing operation of said device.

3. A protective device for use with an electric motor comprising a circuit including a line for supplying electric current to said motor, a transformer connected to said line in series with the motor for providing a current signal related to the motor, a phase shifting network connected to said line for supplying a magnetizing component compensating voltage to the current signal, means for converting the compensated current signal to a D.C. current signal, means taking voltage from the line and converting it to a D.C. voltage providing a reference corresponding to a desired load on the motor, a voltage regulator for maintaining a fixed portion in said reference, a rectifier taking voltage from the line and converting it to D.C. voltage for compensating the said reference for variations in line voltage conditions, and means for comparing the said compensated current signal with the compensated reference including a thyratron adapted to discharge upon the compensated current signal varying beyond a predetermined degree from the compensated reference.

4. A protective device for use with an electric motor comprising an electric circuit including a line for supplying current to said motor, means connected in series with said motor for providing a current signal corresponding to the current in said motor, means for compensating said signal for core losses in said motor, means providing a reference corresponding to a desired load on the motor, means for compensating said reference for variations in line voltage conditions, means for comparing the compensated current signal with the compensated reference, and a relay energized upon the compensated current signal varying beyond a predetermined degree relatively to the compensated reference for causing deenergization of the motor.

5. A protective device for use with an electric motor comprising an electric circuit including a line for supplying electric current to said motor, a current transformer connected in said line in series with the motor to provide a current signal, means taking voltage from said line to compensate the current signal for core losses in the motor, means taking voltage from the line for providing a reference corresponding to a desired load on the motor, means taking voltage from the line for compensating the said reference for variations in line voltage conditions, and means for comparing the compensated current signal with the compensated reference including a thyratron adapted to discharge upon the said compensated signal varying more than a predetermined degree with respect to the compensated reference, and a relay operable upon the discharge of said thyratron.

6. A protective device for use with an electric motor comprising an electric circuit including a line for supplying current to said motor, means connected to said line in series with the motor for providing a current signal, means taking voltage from the line for compensating said signal for the magnetizing component of said motor, separate means taking voltage from the line for compensating the current signal for core losses in the motor, means taking voltage from the line for providing a reference corresponding to a desired load on said motor, means taking voltage from said line and compensating the said reference for variations in line voltage conditions, means for comparing the compensated current signal with the compensated reference, a thyratron adapted to discharge upon the said compensated signal varying with respect to the compensated reference beyond a predetermined degree, and a relay operable upon the discharge of the said thyratron.

7. A protective device for use with an electric motor comprising an electric circuit including a line for supplying electric current to said motor, a current transformer connected in said line in series with the motor to provide a current signal, means connected to the line for supplying a voltage to compensate the current signal for the magnetizing component of the motor current, means for rectifying and filtering the current signal to provide a D.C. current signal proportional to the power producing component of the motor current, means for compensating said D.C. current signal for core loss in the motor by subtracting from said D.C. current signal a D.C. voltage that varies directly with the line voltage and is equal in magnitude to the portion of the D.C. current signal representing said core loss and thereby providing a compensated D.C. current signal, means connected to the line for supplying a reference voltage corresponding to a desired load on the motor, means for automatically compensating said reference voltage for variations in the line voltage, and a thyratron; the said compensated D.C. current signal and the compensated reference being connected in series to the grid and cathode of said thyratron for causing a discharge of current upon the compensated D.C. signal varying beyond a predetermined degree.

8. A protective device as set forth in claim 7 including means for adjusting the compensated reference for a desired load on the motor whereby an increase in said load will cause discharge of the thyratron.

9. A protective device as set forth in claim 7 including means for adjusting the compensated reference for a desired load on the motor whereby a decrease in said load will cause discharge of the thyratron.

10. A protective device for use with an electric motor comprising an electric circuit including a line for supplying electric current to said motor, a current transformer connected in said line in series with the motor to provide a current signal, means connected to the line for supplying a voltage to compensate the current signal for the magnetizing component of the motor current, means for rectifying and filtering the current signal to provide a D.C. current signal proportional to the power producing component of the motor current, means for compensating said D.C. current signal for core loss in the motor by subtracting from said D.C. current signal a D.C. voltage that varies directly with the line voltage and is equal in magnitude to the portion of the D.C. current signal representing said core loss and thereby providing a compensated D.C. current signal, means connected to the line for supplying a reference voltage corresponding to a desired load on the motor, means for rectifying said reference voltage to provide a D.C. reference voltage, means for varying the said D.C. reference voltage inversely with the line voltage to provide a compensated D.C. reference, and a thyratron; the said compensated D.C. current signal and the compensated D.C. reference being connected to the grid and cathode of said thyratron in series and with the polarities opposed for comparing the compensated D.C. current signal with the compensated D.C. reference and causing said thyratron to discharge current upon the compensated D.C. current signal varying with respect to the reference beyond a predetermined degree.

11. A protective device for use with electrically operated means comprising an electric circuit including a line for supplying electric current to said electrically operated means, means connected in said line in series with the electrically operated means for providing a current signal corresponding to the current in said motor, means taking voltage from the line for providing a reference corresponding to a desired load on said electrically operated means, means for comparing said current signal with the said reference including a thyratron having a grid and a cathode adapted to discharge upon the signal varying beyond a predetermined degree relatively to the reference, means for resetting said thyratron after it has discharged, and means for biasing the cathode to facilitate operation of said resetting means.

12. A protective device for use with electrically operated means comprising an electric circuit including a line for supplying electric current to said electrically operated means, means connected in said line in series with the electrically operated means for providing a current signal corresponding to the current in said motor, means taking voltage from the line for providing a reference corresponding to a desired load on said electrically operated means, means for comparing said current signal with the said reference including a thyratron having a grid, a cathode and a plate and adapted to discharge when the grid to cathode potential reaches a predetermined value, means for resetting said thyratron, and a resistor connected in both the cathode to plate circuit and the cathode to grid circuit of said thyratron whereby, when the thyratron discharges, a voltage occurs across said resistor making the grid more negative and thereby rendering it easier to reset said thyratron.

13. A protective device for use with an electric motor comprising an electric circuit including a line for supplying current to said motor, a transformer connected in series with the motor for providing a current signal corresponding to current conditions in the motor, means for compensating said current signal for the magnetizing and core loss components thereof, means including a transformer for taking voltage from the line and providing a reference corresponding to a desired load on said motor, means for compensating said reference in accordance with variations in line voltage conditions, and a thyratron in said circuit having a grid and a cathode; the said compensated current signal and the reference being connected to the said grid and cathode in series and with the polarities opposed whereby an increase in the signal causes the grid to become more positive and increase in the reference causes the grid to become less positive and thereby causing a discharge of the said thyratron upon the signal varying beyond a predetermined degree relatively to the reference.

14. A protective device for use with an electric motor comprising an electric circuit including a line for supplying current to said motor, a current transformer in series with said motor for providing a current signal corresponding to current conditions in said motor, means for providing a compensated reference corresponding to a desired load on said motor; the said means including a transformer taking A.C. voltage from the line and means for rectifying and filtering said voltage to provide a D.C. reference, a regulator providing a fixed portion in the said D.C. reference, means for providing a variable portion in said D.C. reference including a D.C. bridge and means taking A.C. voltage from the line and supplying D.C. voltage to said bridge; the said bridge being balanced at nominal line voltage and normally having a zero output whereby, when line voltage increases above normal, the output of said bridge will be proportional to said increase and when line voltage decreases, the output of said bridge will be proportional to said decrease but its polarity will be opposite to what it is when line voltage is above normal; the said fixed and variable portions of the total D.C. reference being connected in series whereby at line voltage above normal the variable portion subtracts from the fixed portion and at line voltage below normal, the said variable portion adds to the fixed portion and the total D.C. reference varies inversely with line voltage, means for comparing the current signal with the compensated reference, and means operable upon the said signal varying beyond a predetermined degree relatively to the compensated reference for causing a protective operation of said device.

15. A protective device as set forth in claim 14 including means for adjusting the said reference for different desired loads upon the motor.

16. A protective device for use with electrically operated means comprising a circuit including a line for supplying electric current to said electrically operated means, means connected in said circuit providing a current signal related to said electrically operated means, means providing a reference corresponding to a desired load on the electrically operated means, said reference being arranged so that it increases in a linear manner with decreases in line voltage, and decreases in a linear manner with increases in line voltage, and means for comparing said current signal with said reference, and means operable upon departure of said current signal from said reference by a predetermined amount in a selected direction for causing operation of said protective device.

17. A protective device for use with electrically operated means comprising a circuit including a line for supplying electric current to said electrically operated means, means connected in said circuit providing a current signal related to said electrically operated means, means for compensating said current signal for core losses in said electrically operated means, means providing a reference corresponding to a desired load on said electrically operated means, said reference being arranged so that it increases in a linear manner with decreases in line voltage, and decreases in a linear manner with increases in line voltage, and means for comparing the compensated current signal with said reference, and means operable upon departure of said compensated current signal from said reference by a predetermined amount in a selected direction for causing operation of said protective device.

18. A protective device for use with electrically operated means comprising a circuit including a line for supplying electric current to said electrically operated means, means connected in said circuit providing a current signal related to said electrically operated means, means for compensating said current signal for the magnetizing component of current of said electrically operated means, means providing a reference corresponding to a desired load on said electrically operated means, said reference being arranged so that it increases in a linear manner with decreases in line voltage, and decreases in a linear manner with increases in line voltage, and means for comparing the compensated current signal with said reference, and means operable upon departure of said compensated current signal from said reference by a predetermined amount in a selected direction for causing operation of said protective device.

19. A protective device for use with electrically operated means comprising a circuit including a line for supplying electric current to said electrically operated means, means connected in said circuit providing a current signal related to said electrically operated means, means for compensating said current signal for core losses in said electrically operated means, means for compensating said current signal for the magnetizing component of current of said electrically operated means, means providing a reference corresponding to a desired load on said electrically operated means, said reference being arranged so that it increases in a linear manner with decreases in line voltage and decreases in a linear manner with increases in line voltage, and means for comparing the current signal compensated for core losses and magnetizing component with said reference and means operable upon departure of current signal compensated for core losses and magnetizing component from said reference by a predetermined amount in a selected direction for causing operation of said protective device.

References Cited in the file of this patent

UNITED STATES PATENTS

| | | |
|---|---|---|
| 2,532,285 | Brill | Dec. 5, 1950 |
| 2,538,577 | McCarty | Jan. 16, 1951 |
| 2,722,648 | Dunigan | Nov. 1, 1955 |
| 2,832,915 | McCoy | Apr. 29, 1958 |

FOREIGN PATENTS

| | | |
|---|---|---|
| 1,027,262 | France | May 11, 1953 |
| 1,036,597 | France | Sept. 9, 1953 |